Feb. 11, 1969   W. PUNT   3,426,577
SELF-LEVELING SCORSBY MACHINE
Filed Feb. 24, 1966
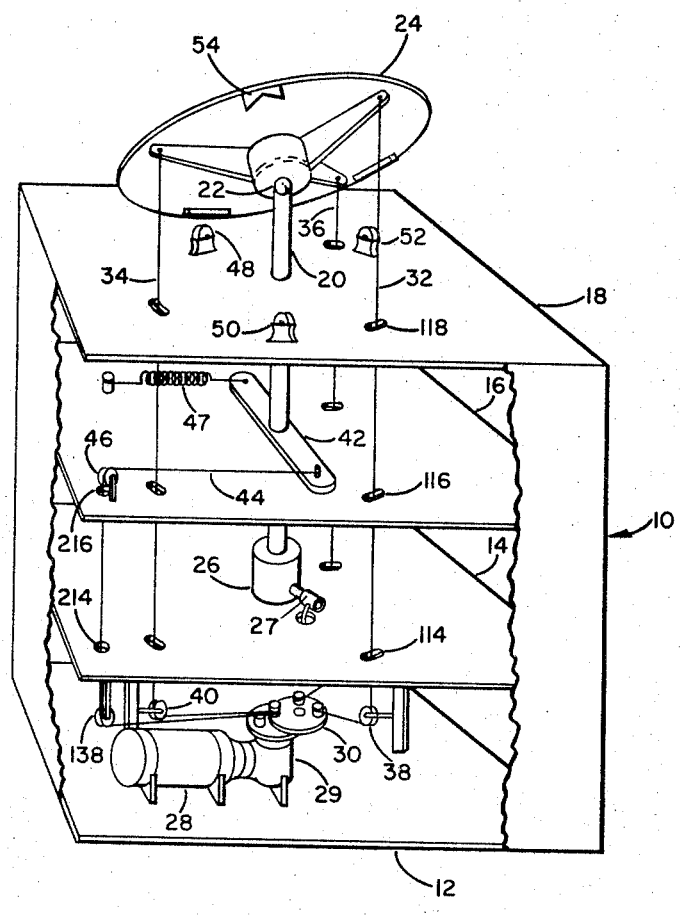
INVENTOR.
WILLIAM PUNT United States Patent Office 3,426,577
Patented Feb. 11, 1969

3,426,577
SELF-LEVELING SCORSBY MACHINE
William Punt, Grand Rapids, Mich., assignor to
Lear Siegler, Inc.
Filed Feb. 24, 1966, Ser. No. 529,758
U.S. Cl. 73—1                                    8 Claims
Int. Cl. G01c 25/00; G01m 7/00

ABSTRACT OF THE DISCLOSURE

A scorsby machine simulating the motions of an aircraft for testing navigation instruments. A platform is provided upon which the instruments are mounted and the platform is subjected to the motions. Means are provided for returning the platform to a horizontal position so that errors in the performance of the instruments can be checked.

---

This invention relates to machines for dynamically testing control instruments, commonly referred to as "scorsby machines," and more particularly to a new form of such a machine having integral structure by which the test platform and the instrument supported thereon for testing purposes may repeatably be precisely brought into a level condition.

Guidance or control instruments such as gyroscopes and the like must be tested by the manufacturer under conditions which simulate those found in actual usage, typically, a motion including roll, pitch, and yaw components. This testing motion has for some time come to be known as "scorsby motion," and it is produced by a device known as a scorsby machine having a tiltable platform or table upon which the instrument is placed and which is then driven with the prescribed motion to test the instrument thereupon while performance readings are taken at various points during the test.

It is also necessary during such testing to periodically place the instrument under test in an almost exactly level position, which in accordance with the high precision of present-day guidance instruments, must sometimes be within a tolerance of from one-quarter degree to one minute. While scorsby machines of the type currently in use can be approximately leveled through careful and precise positioning of their eccentric drive mechanisms the accuracy obtained depends largely upon the cumulative mechanical tolerances of a multiple component linkage system. Consequently, the approximate level condition provided thereby is not sufficiently accurate, and it has become accepted practcie to physically remove the instrument from the test platform and place it upon a fixed level surface, typically a heavy metal or stone plate installed for such a purpose. While this does place the instrument in an accurately level position, moving the instrument from the scorsby platform is very undesirable, since not only is excessive time consumed but the instrument undergoes acceleration forces which are likely to produce at least partially erroneous test readings. Nonetheless, the practice of moving the instrument is normally used, since highly accurate level readings must somehow be taken and no other suitable procedure has previously been available.

It is a major object of the present invention to provide a new form of scorsby machine which includes integral structure by which the testing table or platform is made to be self-leveling, such that at any desired point in the test procedure the scorsby motion consisting of roll, pitch, and yaw components may be stopped, and the test platform immediately placed in an accurately level position, without lifting the instrument from the platform or in any way disturbing its position thereupon.

A further major object of the invention is to provide a new form of scorsby machine having means whereby when the platform is placed in a level condition the means producing scorsby motion are disengaged and in effect disabled, and when the platform is undergoing scorsby motion, the means for leveling the platform are disengaged or disabled.

The foregoing major objects of the invention and the advantages thereof, together with additional objects and advantages no less a part thereof, will become increasingly apparent to those skilled in the pertinent arts upon further consideration of the ensuing specification and its appended claims, particularly when taken in conjunction with the accompanying illustrative drawings setting forth a preferred embodiment of the device.

In the drawings:

The single figure is a fragmentary frontal perspective view of the composite device.

Briefly stated, the present invention provides a new form of self-leveling scorsby machine for dynamically testing control instruments. The machine includes a platform for mounting such instruments, support means for said platform providing a universally pivotal mount therefor, drive means for imparting vehicle motion-simulating scorsby movements to said platform, means for positioning the platform in a level orientation, and means for alternately engaging said platform with said drive means and said positioning means, such that the platform may selectively be leveled or driven in scorsby motion.

Referring now in more detail to the drawings, the composite machine 10 is preferably housed within an appropriate cabinet and has a series of fixedly mounted support plates, including a base plate 12, a first plate 14, a second plate 16, and a third or top plate 18. As will be seen, the aforesaid plates are structural supporting members and consequently in the broader aspects of the invention other such structural members may be utilized; the illustrated support plates are preferred, however, and provide a very acceptable structure. The second and top plates 16 and 18, respectively, have a central aperture formed therein, and a support means in the form of a vertical shaft 20 passes upwardly therethrough. Shaft 20 has a universal joint 22 at its top, by which a platform 24 upon which instruments may be mounted for test is universally pivotally secured to the shaft 20. A fluid-actuable (preferably pneumatic) cylinder 26 is mounted atop the first plate 14, and the support shaft 20 is operatively coupled to or forms an integral extension of the piston member of the said cylinder. As will be understood, the piston is controlled by air pressure supplied to the cylinder 26, preferably through an electrically actuated control valve 27, such that when the valve 27 is actuated the cylinder is pressurized and the piston and support shaft 20 are extended upwardly from the cylinder 26 to raise the platform 24 vertically a desired distance, whereas when the control valve 27 is oppositely actuated the air pressure is exhausted from the cylinder 26, and the shaft 20 and platform 24 are lowered.

An electric motor 28 and a rotary eccentric disc 30 coupled to the motor through an appropriate drive means or gear box 29 to be driven thereby are mounted atop the base plate 12, such that the disc 30 is horizontally oriented, parallel to the base 12 and the other structural plates. A series of three force-transmitting tension cables 32, 34, and 36 are secured to the underside of the platform 24 near the perimeter thereof, in an equally spaced, symmetrical manner, with each cable spaced 120 degrees from either of the other two cables relative to the center of the platform. Each of the cables 32, 34 and 36 extends through an appropriate set of vertically aligned apertures such as 118, 116, and 114 formed in plates 18, 16, and 14, respectively, and each is then entrained about one of three pulley members such as are seen at 38 and 40, which are secured at 120 degree spacings relative to the shaft 20 and the centers of the various plates. The three cables 32, 34 and 36 are then connected to the eccentric disc 30 at 120 degree spacings. Each of the cables 32, 34, and 36 are nominally of the same length. Consequently, as the disc 30 is driven in an eccentric pattern, the different cables will be sequentially pulled and released through the corresponding pulleys in a coordinated, alternating manner as the disc 30 moves away from and approaches a particular pulley. This in effect alternatingly and sequentially pulls downward on the platform 24 at the point where a particular cable is connected thereto, thereby producing a conically-shaped pattern of platform motion about the universal joint 22 at the top of the shaft 20, which motion combines pitching and rolling components.

Immediately above the second plate 16 a horizontally-disposed cross arm 42 extends laterally of the vertical support shaft 20. A tension cable 44 is secured to one end of arm 42, so as to extend horizontally away from the said arm and approximately normal thereto. This cable is entrained over a pulley 46 which may be secured to the second plate 16. Cable 44 is then extended downwardly through an aperture 216 formed in plate 16 and an aperture 214 in plate 14. Cable 44 then is entrained around a pulley 138 located between plates 12 and 14, from which the cable is extended to the eccentric disc 30, to which it is secured. As will be apparent, the eccentric motion of disc 30 causes cable 44 to alternatively be tightened, to pull cross arm 42 towards pulley 46, and then to be relaxed, so that cross arm 42 may return to its original position. In order to return cross arm 42 in this manner, a return mechanism is desirable for the end of cross arm 42 which is opposite from cable 44. Such a return mechanism may if desired be a second cable arrangement exactly comparable to cable 44 and attached to the eccentric disc 30 opposite cable 44, or it may if desired simply be a resilient tension spring 47 connected between the said opposite end of the cross arm and a fixed point on the plate 16, as illustrated.

Inasmuch as cross arm 42 is fixedly connected to the vertical support shaft 20, as by splining for example, it will be clear that the horizontal oscillatory movements imparted to the cross arm cause an angular oscillatory motion to be imparted to both the support shaft 20 and the platform 24 universally joined thereto. This reciprocating rotary motion is derived from the same source as the revolving conical motion noted previously, i.e., the driven eccentric disc 30. Consequently, both motions are integrated or blended together at the platform 24, and the motion produced by the cross arm 42 and its driving components thus simulates the yaw component experienced in flight. When this yaw component is combined with the pitch and roll components produced by cables 32, 34, and 36, the composite three-component motion represents what is termed scorsby movement, and it serves to simulate very well all anticipated actual vehicle movements. The amplitude of this resulting scorsby motion is controlled by the length of the eccentric stroke of disc 30, which may be made variable if desired through an appropriate linkage of a known type. It should be pointed out that since the yawing motion produced by cross arm 42 causes platform 24 to rotatably oscillate in relatively small magnitudes, apertures such as 118 and 116 formed in plates 18 and 16, respectively, should be elongated and made slightly arcuate, as shown, to accommodate the yawing motion which naturally will be transmitted to the cables 32, 34, and 36.

Mounted atop the top structural plate 18 are a triad of equally spaced platform arrestment pads 48, 50, and 52, each preferably positioned between a pair of adjacent cables 32, 34, and 36, so as to be symmetrically spaced about the support post 20 and the center of the platform 24. The arrestment pads provide a means for positioning the platform 24 in a level orientation, and preferably consist of upright posts extending vertically from structural plate 18 with a roller bearing rotatably secured to the top of each post for rollably contacting the underside of the platform. Each of the arrestment pads, including its post and roller, is accurately positioned vertically to place the platform in a level condition when the same rests atop the pads. Further, an inverted generally V-shaped ramp structure 54 is secured to the underside of the platform 24 with the center of the ramp in vertical alinement with the top of one of the arrestment pads, for example pad 50.

The oppositely-declining surfaces of ramp 54 should have a length slightly exceeding the maximum expected angular displacement of the platform 24 under the yaw movements imparted thereto by arm 42 and shaft 20. Consequently, when the platform is lowered into arrestment upon the three pads, regardless of the particular yaw displacement of the platform from a nominal or centered position, one of the sides of the ramp will be placed atop the roller on pad 50, and the resulting unbalance will cause the roller to rotate against the ramp surface until the ramp is centered directly atop the roller. During this time, the points of contact of the platform 24 with the other two arrestment pad rollers will move relative thereto, rotating the two said rollers, to the predetermined nominal or centered position. Thus, the inverted V-shaped ramp 54 and the rollable members atop the arrestment pads provide cooperating structure for indexing the rest position of the platform relative to the pads, such that whenever the platform is at rest it will always occupy the same angular or rotational position upon the arrestment pads.

From the foregoing, it will be clear that upon energizing the control valve 27 to admit pneumatic or other fluid pressure to the cylinder 26, support shaft 20 will be raised a predetermined amount, thereby accordingly elevating the platform 24 above the arrestment pads 48, 50, and 52. This elevation makes taut the cables 32, 34, and 36 secured to the underside of the platform 24 near the periphery thereof, such that when the motor 28 is energized to drive the eccentric disc 30, the resulting eccentric movement of the disc brings about the coordinated sequential tightening and relaxing of the various cables which imparts scorsby motion to the platform 24. Conversely when the control valve 27 is de-energized and the pressurized fluid bleeds from the cylinder 26, the support shaft 20 is gradually lowered, thereby lowering platform 24 into contact with the arrestment pads and slackening all of the cables 32, 34, 36, and 44. Thus, energizing and de-energizing the control valve 27 causes the cylinder 26 to shift the support 20 and platform 24 between alternate positions, in one of which the platform leveling means is operative while the scorsby motion-imparting drive is inoperative, and in the other of which the aforesaid conditions are reversed. The advantages of this arrangement will immediately be apparent, since control instruments supported atop the platform 24 never need be removed therefrom to be tested under perfectly accurate level conditions, and the entire arrangement lends itself very well to automated testing techniques in which certain predetermined sequences of testing movements are programmatically carried out.

It is entirely conceivable that after considering the foregoing disclosure, others may design further embodiments of the concept underlying the single preferred embodiment shown and described herein, or may effect certain changes or modifications in this single specific structure. Accordingly, all such further embodiments or changes in structure as incorporate the underlying spirit and the concepts of the invention are thus to be considered within the scope of the claims appended here below, unless these claims by their language specifically state otherwise.

I claim:
1. A self-leveling scorsby machine for dynamically testing control instruments, comprising: a platform for mounting such instruments; support means for said platform providing a universally pivotal mount therefor; drive means for imparting vehicle motion-stimulating scorsby movements to said platform; means for positioning said platform in a level orientation; and means for alternatively engaging said platform in operative relation with said drive means and said positioning means, such that said platform may selectively be leveled or driven in scorsby motion; said means for alternatively engaging said platform including a platform shifting means arranged to physically lift and lower said platform between a first position in which said drive means may operate to impart said scorsby motion to said platform and a second position in which said platform is restrained in a level position by said positioning means.

2. The self-leveling scorsby machine defined in claim 1, wherein said positioning means comprises a plurality of spaced arrestment pads against which said platform may be placed for leveling, and said second platform position is in level arrestment against said pads.

3. The self-leveling scorsby machine defined in claim 2, wherein said support means includes a shaft and a universal joint connecting the shaft to the center of said platform, and wherein said platform shifting means acts upon said shaft to effect longitudinal movement thereof and thereby shift said platform.

4. The self-leveling scorsby machine defined in claim 3, wherein said arrestment pads are upright posts having platform-contacting means at their upper ends, wherein said posts are arranged symmetrically beneath said platform, and wherein said shifting means is arranged to lower said platform by said shaft into vertical supporting arrestment onto said posts in said second position.

5. The self-leveling scorsby machine defined in claim 4, wherein said platform and said arrestment pad platform-contacting means include cooperative structure for indexing the relative positions thereof when said platform is lowered onto said means, such that whenever said platform is at rest in said second position it will always occupy the same position relative to said pads.

6. The self-leveling scorsby machine defined in claim 3, wherein said drive means for imparting scorsby movements to said platform acts upon the outer extremities of the platform to tiltingly move the same upon its central universal support.

7. The self-leveling scorsby machine defined in claim 4, wherein said drive means for imparting scorsby movements to said platform acts upon the outer extremities of the platform to tiltingly move the same upon its central universal support, and wherein said platform shifting means raises said platform away from said arrestment pad posts to operatively engage said drive means and lowers said platform onto said posts to operatively disengage said drive means.

8. The self-leveling scorsby machine defined in claim 7, wherein said drive means include force-transmitting tension cable means connected to said platform, said cables being drawn taut by said shifting means raising of said platform.

References Cited

FOREIGN PATENTS 558,374  12/1944  Great Britain.

S. CLEMENT SWISHER, *Primary Examiner.*